(12) United States Patent
Pao

(10) Patent No.: US 12,186,882 B2
(45) Date of Patent: Jan. 7, 2025

(54) TELESCOPIC ROD DEVICE

(71) Applicant: STEP2GOLD CO., LTD., Taichung (TW)

(72) Inventor: Chih-Ting Pao, Taichung (TW)

(73) Assignee: Step2Gold Co., Ltd., Taichung (TW)

( * ) Notice: Subject to any disclaimer, the term of this patent is extended or adjusted under 35 U.S.C. 154(b) by 24 days.

(21) Appl. No.: 18/356,327

(22) Filed: Jul. 21, 2023

(65) Prior Publication Data

US 2024/0058941 A1 Feb. 22, 2024

(30) Foreign Application Priority Data

Aug. 17, 2022 (TW) .................................. 111131030

(51) Int. Cl.
*B25G 1/04* (2006.01)
*F16B 7/10* (2006.01)

(52) U.S. Cl.
CPC ............... *B25G 1/04* (2013.01); *F16B 7/105* (2013.01)

(58) Field of Classification Search
CPC ... A45C 13/26; A45C 13/262; A45C 2013/26; A45C 2013/267; A45C 2013/262; A45C 5/14; B62B 5/06; B62B 5/067; B62B 5/065; B25G 1/04; F16B 7/105; B25H 3/02
See application file for complete search history.

(56) References Cited

U.S. PATENT DOCUMENTS

| | | | | |
|---|---|---|---|---|
| 5,308,103 A | * | 5/1994 | Chin-Shung | B62B 1/125 280/655 |
| 5,499,702 A | * | 3/1996 | Wang | A45C 13/262 280/37 |
| 5,655,260 A | * | 8/1997 | Chang | A45C 13/262 16/113.1 |
| 5,893,196 A | * | 4/1999 | Tserng | A45C 13/262 280/655 |
| 6,061,871 A | * | 5/2000 | Wang | A45C 13/262 280/37 |

(Continued)

FOREIGN PATENT DOCUMENTS

| | | | |
|---|---|---|---|
| CN | 101434063 A | * | 5/2009 |
| TW | M487612 | | 10/2014 |
| TW | I709466 | | 11/2020 |

OTHER PUBLICATIONS

Search Report appended to an Office Action, which was issued to Taiwanese counterpart application No. 111131030 by the TIPO on May 17, 2023, with an English translation thereof, 2 pages.

*Primary Examiner* — Chuck Y Mah
(74) *Attorney, Agent, or Firm* — Burris Law, PLLC

(57) ABSTRACT

A telescopic rod device includes an outer tube including adjustment holes, an inner tube having a through hole, an actuator unit mounted inside the inner tube and has an actuating portion, and an adjustment control unit having a restraining member that has a restraining portion, a resilient member, and a lug connected with the resilient member and protruding from the through hole to engage with an adjustment hole. The resilient member biases the lug to extend out of the through hole and engage an adjustment hole, and when the actuator unit moves relative to the inner tube, the actuating portion of the actuator unit actuates movement of the restraining portion, and the restraining member acts on the resilient member so that the lug disengages the adjustment hole.

8 Claims, 10 Drawing Sheets

(56) References Cited

U.S. PATENT DOCUMENTS

| | | | | |
|---|---|---|---|---|
| 6,134,749 | A * | 10/2000 | Kuo | A45C 13/262 280/655 |
| 6,148,477 | A * | 11/2000 | Cheng | A45C 13/262 280/655 |
| 6,338,586 | B1 * | 1/2002 | Kuo | A45C 13/262 190/115 |
| 6,405,407 | B1 * | 6/2002 | Chen | A45C 13/262 190/118 |
| 8,001,655 | B2 * | 8/2011 | Wang | A45C 13/262 16/113.1 |
| 8,214,972 | B2 * | 7/2012 | Lai | A45C 13/262 16/427 |
| 2002/0095745 | A1 * | 7/2002 | Wang | A45C 13/262 16/405 |
| 2014/0137370 | A1 * | 5/2014 | Lo | A45C 13/262 16/113.1 |

* cited by examiner

TELESCOPIC ROD DEVICE

CROSS-REFERENCE TO RELATED APPLICATION

This application claims priority to Taiwanese Invention Patent Application No. 111131030, filed on Aug. 17, 2022.

FIELD

The disclosure relates to a telescopic rod device, and more particularly to a telescopic rod device capable of quick adjustment.

BACKGROUND

Referring to FIG. 10, a conventional telescopic rod device according to Taiwanese Invention Patent No. 1709466 is shown. The conventional telescopic rod device includes a first rod member 100, a second rod member 200, and a positioning unit 300. The first rod member 100 is hollow and has an inner space 110, and a positioning hole 120 that communicates with the inner space 110. The second rod member 200 is movably inserted in the inner space 110 of the first rod member 100, and has a plurality of second positioning holes 210. Any one of the second positioning holes 210 may be aligned with the first positioning hole 120. The positioning unit 300 includes a control member 310, a positioning member 320, and a resilient member 330. The control member 310 is movably sleeved over the first rod member 100. The positioning member 320 is movably inserted through the first positioning hole 120 and located between the second rod member 200 and the control member 310. The control member 310 may be operated to depress the positioning member 320 or release the positioning member 320 from depression. The resilient member 330 is connected with the positioning member 320 and is able to elastically deform when the positioning member 320 is depressed by the control member 310. When the positioning member 320 is not depressed by the control member 310 the positioning member 320 is biased to move out of the first positioning hole 120 by the resilient member 330, thereby allowing the second rod member 200 to be moved relative to the first rod member 100.

When an operator operates the control member 310, the positioning member 320 may be depressed by the control member 310 to be inserted through the first positioning hole 120 and extend into the second positioning hole 210 that is aligned with the first positioning hole 120. At this state the conventional telescopic rod device is in a fixed position. The operator may then operate the control member 310 to release the positioning member 320 from depression, and the positioning member 320 will be biased by the resilient member 330 to move out of the first positioning hole 120 and the aligned second positioning hole 210. At this state the conventional telescopic rod device is in a released position and the first rod member 100 may be moved relative to the second rod member 200 so that the length of the conventional telescopic rod device may be to changed to a desired length.

A disadvantage of the conventional telescopic rod device is that the control member 310 is sleeved over the first rod member 310 and can be unintentionally operated. Additionally, the operator needs to apply a sufficient amount of strength in order to elastically deform the resilient member 330 and depress the positioning member 320. This is quite inconvenient for the operator, especially if quick adjustment of the conventional telescopic rod is necessary. In addition, the conventional telescopic rod has a complicated structure that is difficult to manufacture and assemble.

SUMMARY

Therefore, an object of the disclosure is to provide a telescopic rod device that can alleviate at least one of the drawbacks of the prior art.

According to the disclosure, the telescopic rod device is capable of quick adjustment and includes an outer tube, an inner tube, an actuator unit, and an adjustment control unit. The outer tube has a lengthwise axis, and includes an outer wall that surrounds an outer tube inner space, and a plurality of adjustment holes that penetrate through the outer tube wall, and that are spaced apart along the lengthwise axis. The inner tube is mounted inside the outer tube and is movable along the lengthwise axis, and has an inner tube wall that surrounds an inner tube space, and a through hole that is formed through the inner tube wall. The actuator unit is mounted inside the inner tube, is movable in the lengthwise axis, and has at least one actuating portion. The adjustment control unit is installed inside the inner tube and has a restraining member, a resilient member, and a lug. The restraining member has at least one restraining portion to interact with the at least one actuating portion, and is movable along a first widthwise axis of the outer tube which is perpendicular to the lengthwise axis. The resilient member is connected to the restraining member. The lug is connected to the resilient member and protrudes from the through hole of the inner tube to engage with one of the adjustment holes of the outer tube wall of the outer tube. One of the at least one actuating portion and the at least one restraining portion has an inclined slide surface that is inclined with the lengthwise axis and the first widthwise axis, and the other one of the at least one actuating portion and the at least one restraining portion is slidable on the inclined slide surface. The resilient member constantly biases the lug to extend out of the through hole of the inner tube and engage one of the adjustment holes. When the actuator unit moves relative to the inner tube along the lengthwise axis, the at least one actuating portion of the actuator unit actuates movement of the at least one restraining portion of the restraining member along the first widthwise axis, and the restraining member acts on the resilient member so that the lug disengages from the one of the adjustment holes, thereby converting the lug between an engaging position and a disengaging position.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
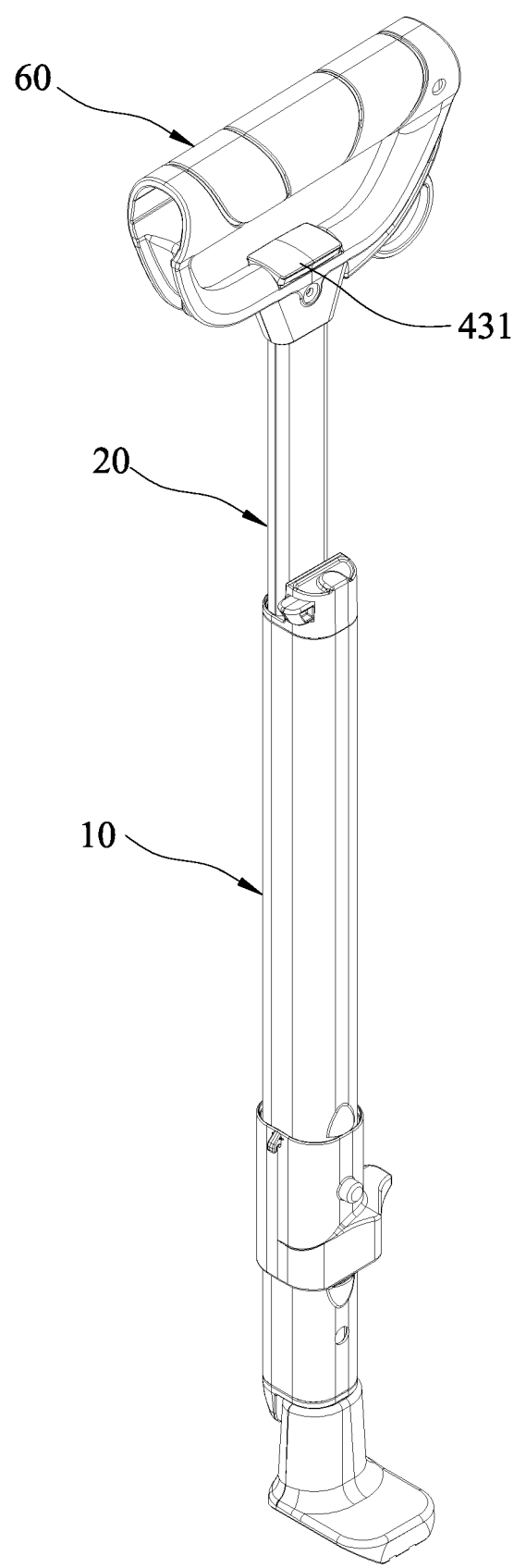
FIG. 1 is a perspective view illustrating an embodiment of the telescopic rod device according to the present disclosure.
Figure 2:
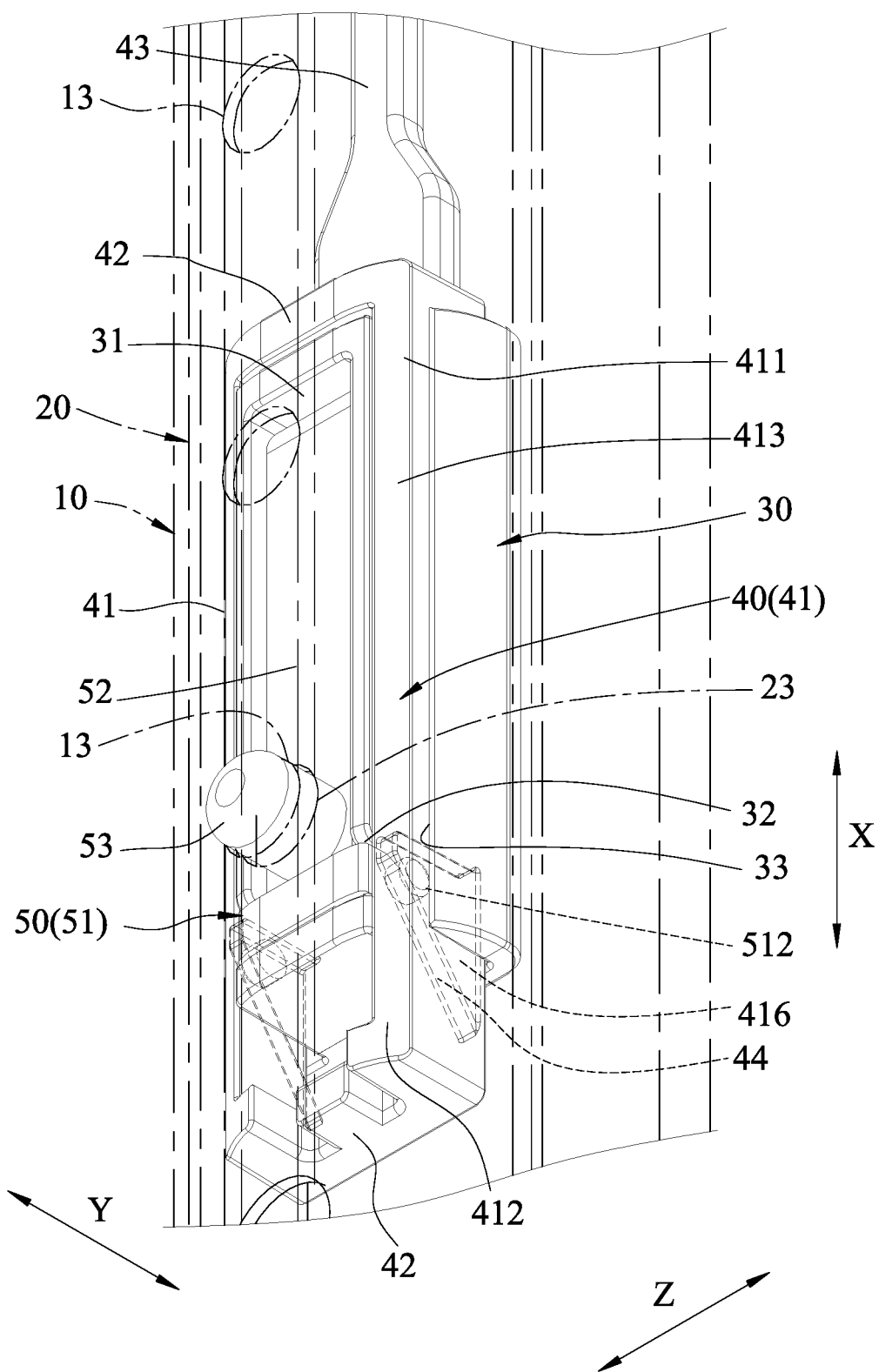
FIG. 2 is a fragmentary schematic and perspective view illustrating an actuator unit and an adjustment control unit of the embodiment.
Figure 3:
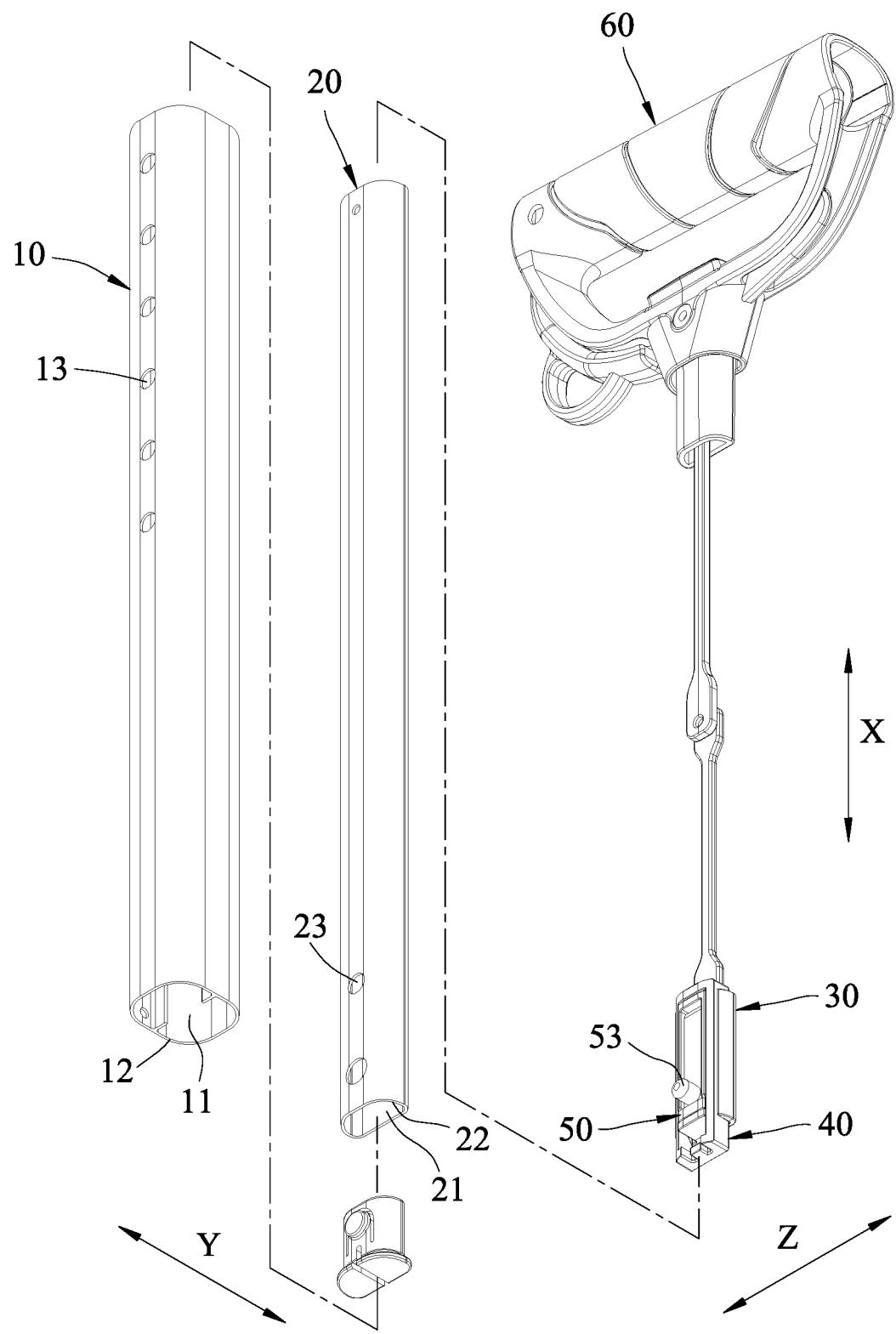
FIG. 3 is an exploded perspective view showing the embodiment.
Figure 4:
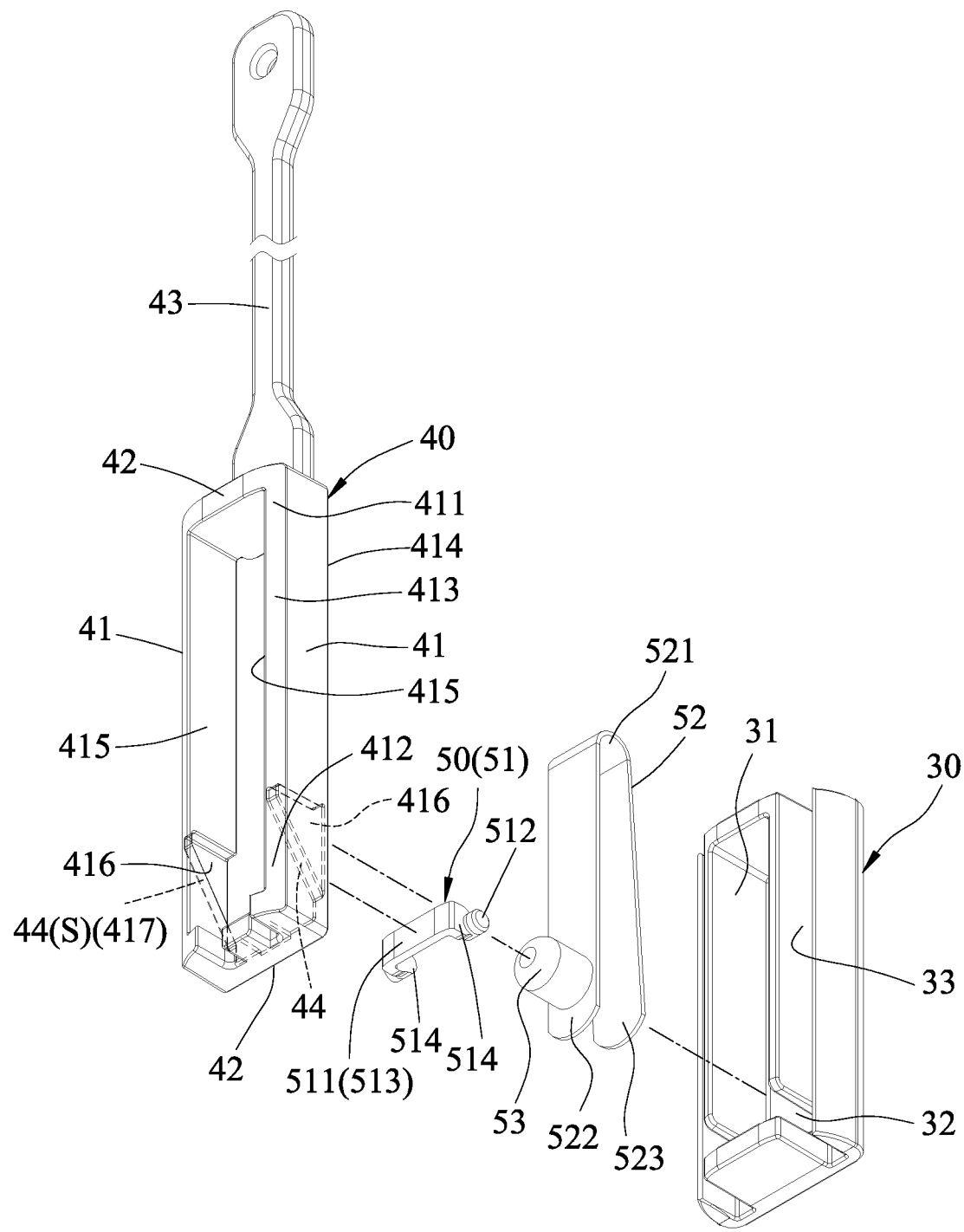
FIG. 4 is a fragmentary exploded schematic and perspective view of the embodiment.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

FIGS. 1 to 4 show an embodiment of a telescopic rod device that is capable of quick adjustment according to the present disclosure. The telescopic rod device includes an outer tube 10, an inner tube 20, a positioning seat 30, an actuator unit 40, an adjustment control unit 50, and a handle 60. In this embodiment, the positioning seat 30 is immovably mounted inside the inner tube 20 to receive the actuator unit 40.

The outer tube 10 has a lengthwise axis (X), and includes an outer tube wall 12 that surrounds an outer tube inner space 11, and a plurality of adjustment holes 13 that penetrate through the outer tube wall 12, and that are spaced apart from each other along the lengthwise axis (X).

The inner tube 20 is mounted inside the outer tube 10 and is movable along the lengthwise axis (X), and has an inner tube wall 22 that surrounds an inner tube space 21, and a through hole 23 that is formed through the inner tube wall 21. The handle 60 is connected to an upper end of the inner tube 20.

The positioning seat 30 is immovably mounted inside the inner tube and has an installation slot 31, a sliding slot 32, and a pair of guiding slots 33. The sliding slot 32 extends along a first widthwise axis (Y) of the outer tube 10 perpendicular to the lengthwise axis (X), extends across and spatially communicates with the installation slot 31, and intersects the guiding slots 33. The pair of guiding slots 33 are spaced apart from each other along a second widthwise axis (Z) of the outer tube 10 that is perpendicular to the lengthwise axis (X) and the first widthwise axis (Y), and are respectively formed on two opposite sides of the installation slot 31.

The actuator unit 40 is mounted inside the inner tube 20, and is movable in the lengthwise axis (X). The actuator unit 40 has a pair of spaced apart side panels 41, two spaced apart end panels 42, a linkage rod 43, and two actuating portions 44. The pair of side panels 41 respectively and slidably extend through the pair of guiding slots 33. The two end panels 42 intersectingly connect between the side panels 41. The linkage rod 43 is connected to one of the end panels 42 and extending along the lengthwise axis (X) to protrude from the inner tube 20. The side panels 41 of the actuator unit 40 each have a first edge 411, a second edge 412 that is opposite to the first edge 411 along the lengthwise axis (X), a third edge 413 that intersectingly connect between the first edge 411 and the second edge 412, and a fourth edge 414 that is opposite to the third edge 413 along the first widthwise axis (Y). The side panels 41 respectively have inner surfaces 415 that face toward each other and that are recessed to form guide grooves 416, respectively. The two actuating portions 44 are inclined slide surface (S) each of which is located on a groove wall 417 that bounds one of the guide grooves 416. The inclined slide surface (S) of each of the actuating portions 44 extends from the third edge 413 of the respective side panel 41 towards the fourth edge 414 and is inclined to approach the second edge 412 when reaching the fourth edge 414. The linkage rod 43 has an operating grip 431 that is nearer to the first edge 411 of the side panels 41 than the second edge 412, and that is exposed from the handle 60.

The adjustment control unit 50 is installed inside the inner tube 20 and has a restraining member 51, a resilient member 52, and a lug 53. The restraining member 51 has a U-shaped frame 511, and two restraining portions 512 to interact with the two actuating portions 44, respectively. The restraining portions 512 are movable along the first widthwise axis (Y) of the outer tube 10. The U-shaped frame 511 of the restraining member 51 has a bar 513, and two side arms 514 that are disposed on opposite sides of the bar 513, that are interconnected by the bar 513, and that are spaced apart in the second widthwise axis (Z). The two restraining portions 512 are in the form of guide posts connected to the side arms 514, respectively.

The installation slot 31 accommodates the resilient member 52. The resilient member 52 is interconnected to the restraining member 51. The lug 53 is connected to the resilient member 52 and protruding from the through hole 23 of the inner tube 20 to engage with one of the adjustment holes 13 of the outer tube wall 12 of the outer tube 10.

More specifically, the resilient member 52 has a U-shaped curved portion 521 and two end portions 522, 523 that extend from opposite ends of the curved portion 521 and that are spaced apart in the first widthwise axis (Y), and the lug 53 is connected to one of the two end portions 522, 523, specifically in this embodiment, the end portion 522. The end portion 522, which connects the lug 53, resiliently urges the restraining portions 512 of the restraining member 51. The U-shaped frame 511 straddles the end portion 522 so that the restraining portions 512 (guide posts) are on two sides of the end portion 522. The resilient member 52 constantly biases the lug 53 to extend out of the through hole 23 of the inner tube 20 and engage one of the adjustment holes 13.

While in this embodiment there are two actuating portions 44 which are the inclined slide surfaces (S), and two restraining portions 512 which are the guide posts slidable on the inclined slide surfaces (S), the telescopic rod device according to the present disclosure may have only one actuating portion 44 and only one restraining portion 512 in other embodiments. In addition, one of the actuating portion 44 and restraining portion 512 may be the inclined slide surface (S) that is inclined with the lengthwise axis (X) and the first widthwise axis (Y), and the other one of the actuating portion 44 and restraining portion 512 may be the guide post slidable on the inclined slide surface (S). The restraining member 51 is slidably mounted in the sliding slot 32 and is movable along the first widthwise axis (Y).

The restraining member 51 is slidably mounted in the sliding slot 32, and extends across the installation slot 31. The restraining portions 512 of the restraining member 51 respectively extend into the guiding slots 33 to respectively slide on the inclined slide surfaces S of the two actuating portions 44.

Figure 5:
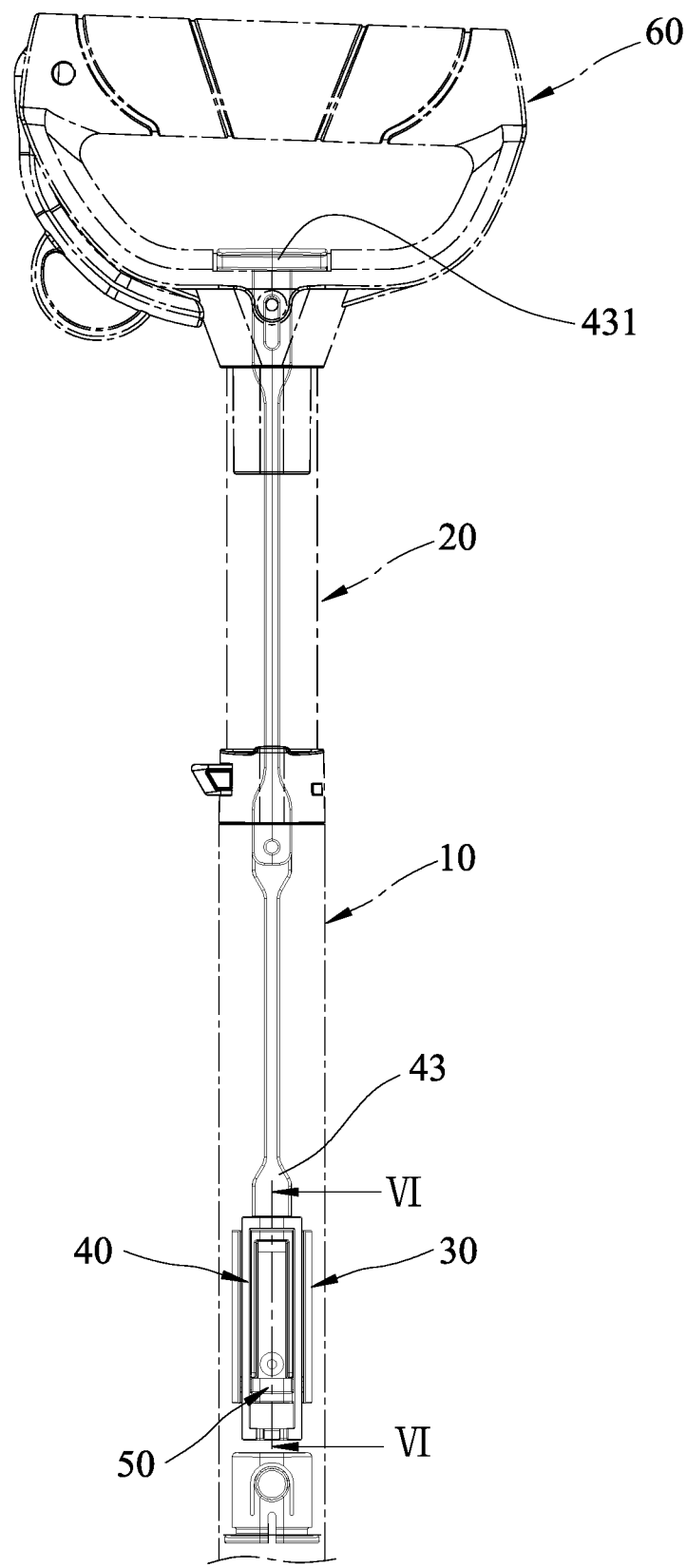
FIG. 5 is a frontal ghosted view of the embodiment.
Figure 6:
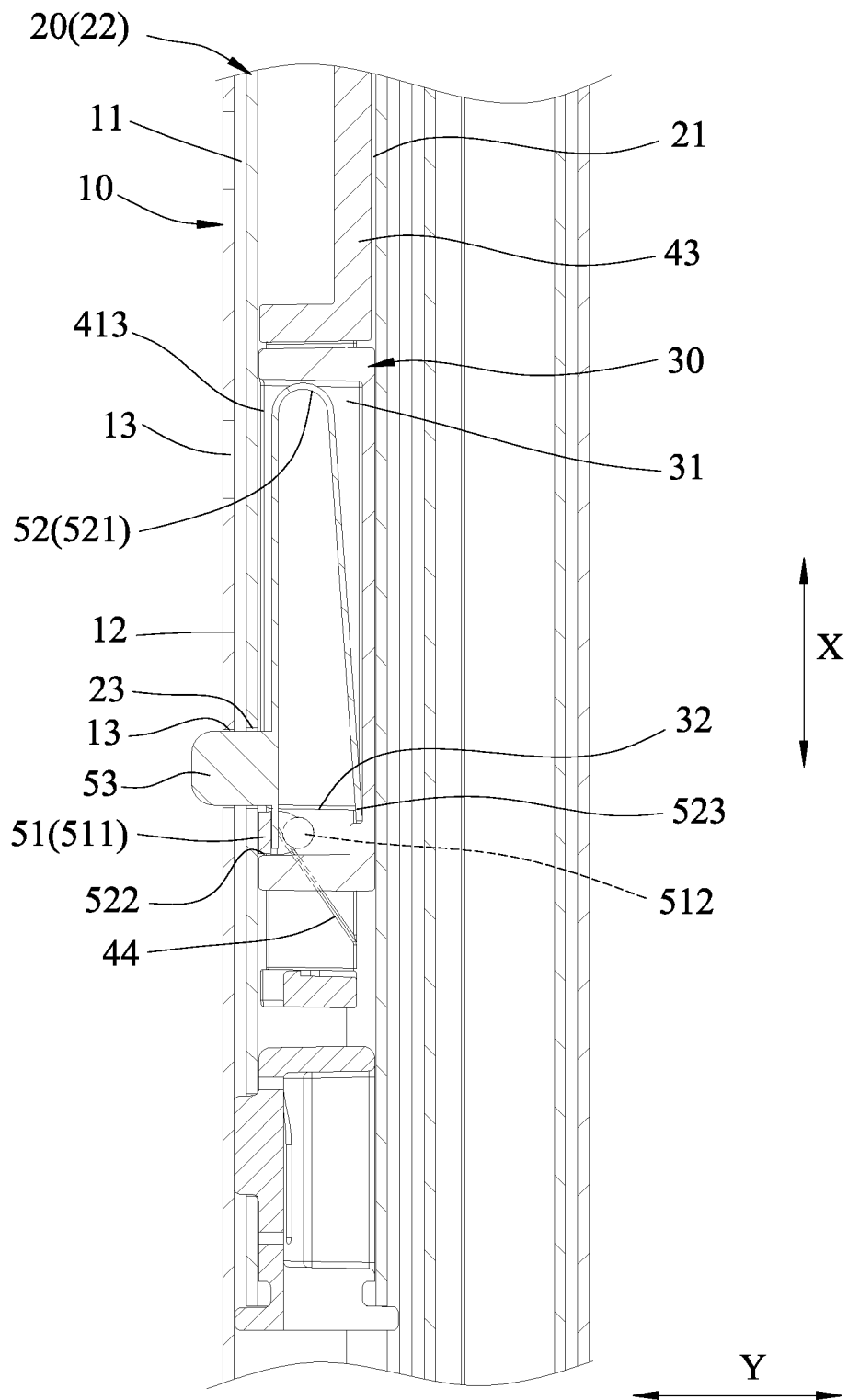
FIG. 6 is a fragmentary cross-sectional view taken from VI-VI in FIG. 5.

Referring to FIGS. 1, 5 and 6, the lug 53 extends out of the through hole 23 of the inner tube 20 and is engaged with one of the adjustment holes 13. At this state the lug 53 is in an engaging position, and the position of the outer tube 10 relative to the inner tube 20 is fixed. As the resilient member 52 resiliently biases the restraining member 51 so that the restraining portions 512 of the restraining member 51 are respectively at highest positions on the actuating portions 44, i.e., the highest positions on the inclined surfaces (S) of the groove wall 417 of the guide grooves 416, which are adjacent to the third edges 413 of the side panels 41.

Figure 7:
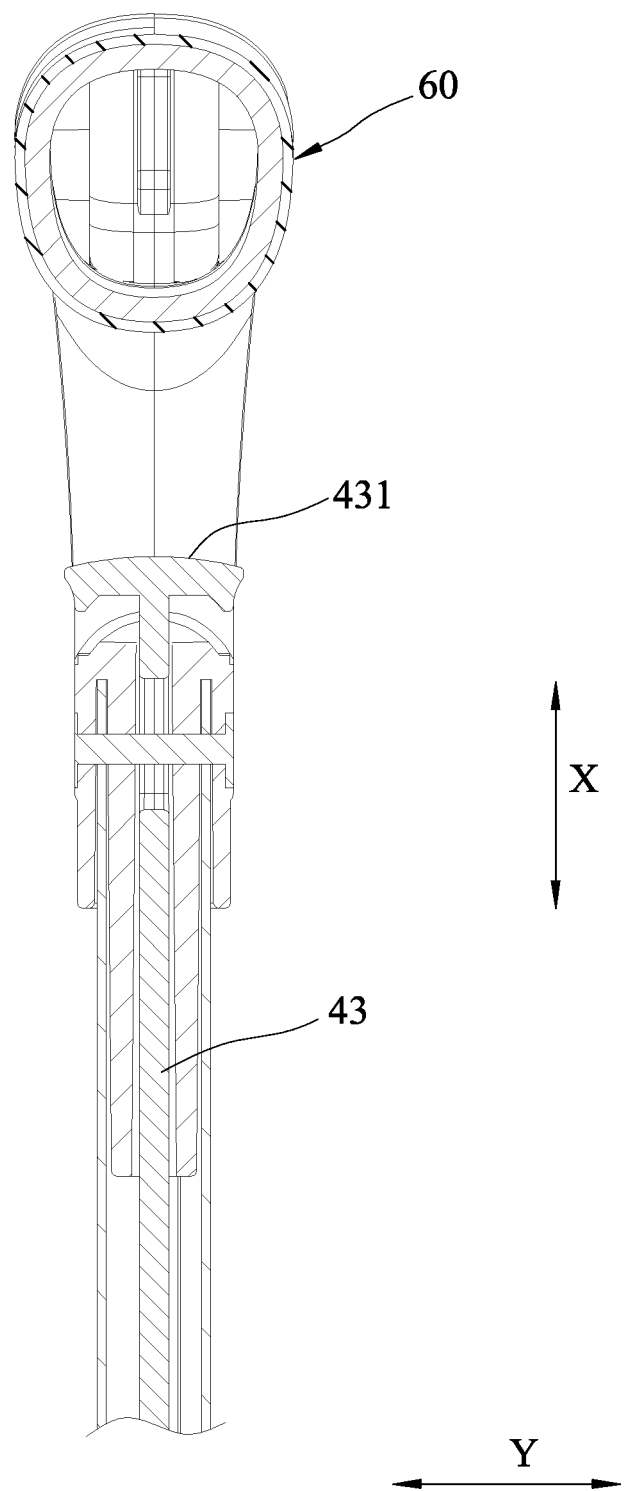
FIG. 7 is a fragmentary cross-sectional view of the embodiment showing operation of the telescopic rod device.
Figure 8:
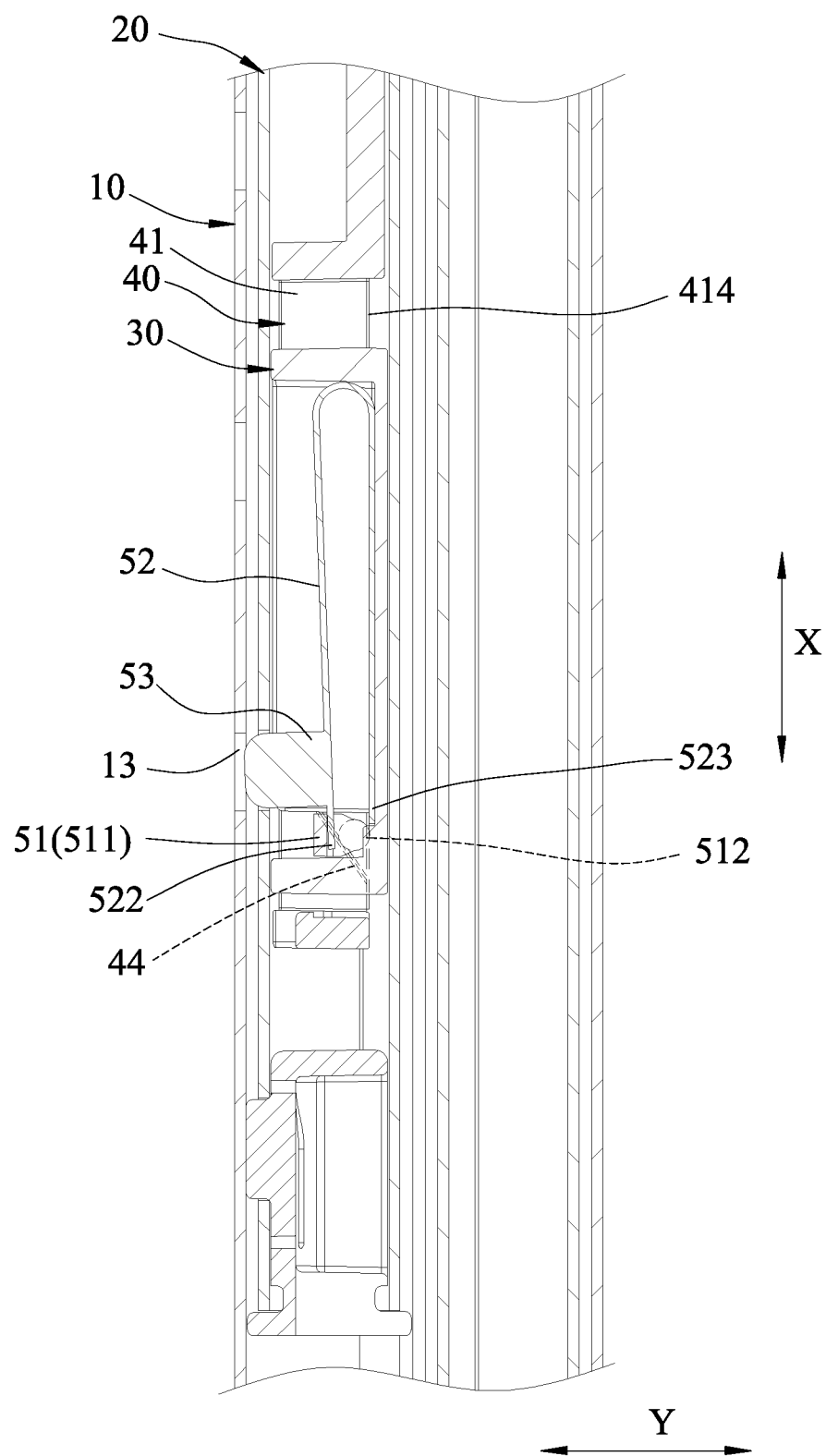
FIG. 8 is a fragmentary cross-sectional view of the embodiment showing operation of the telescopic rod device.
Figure 9:
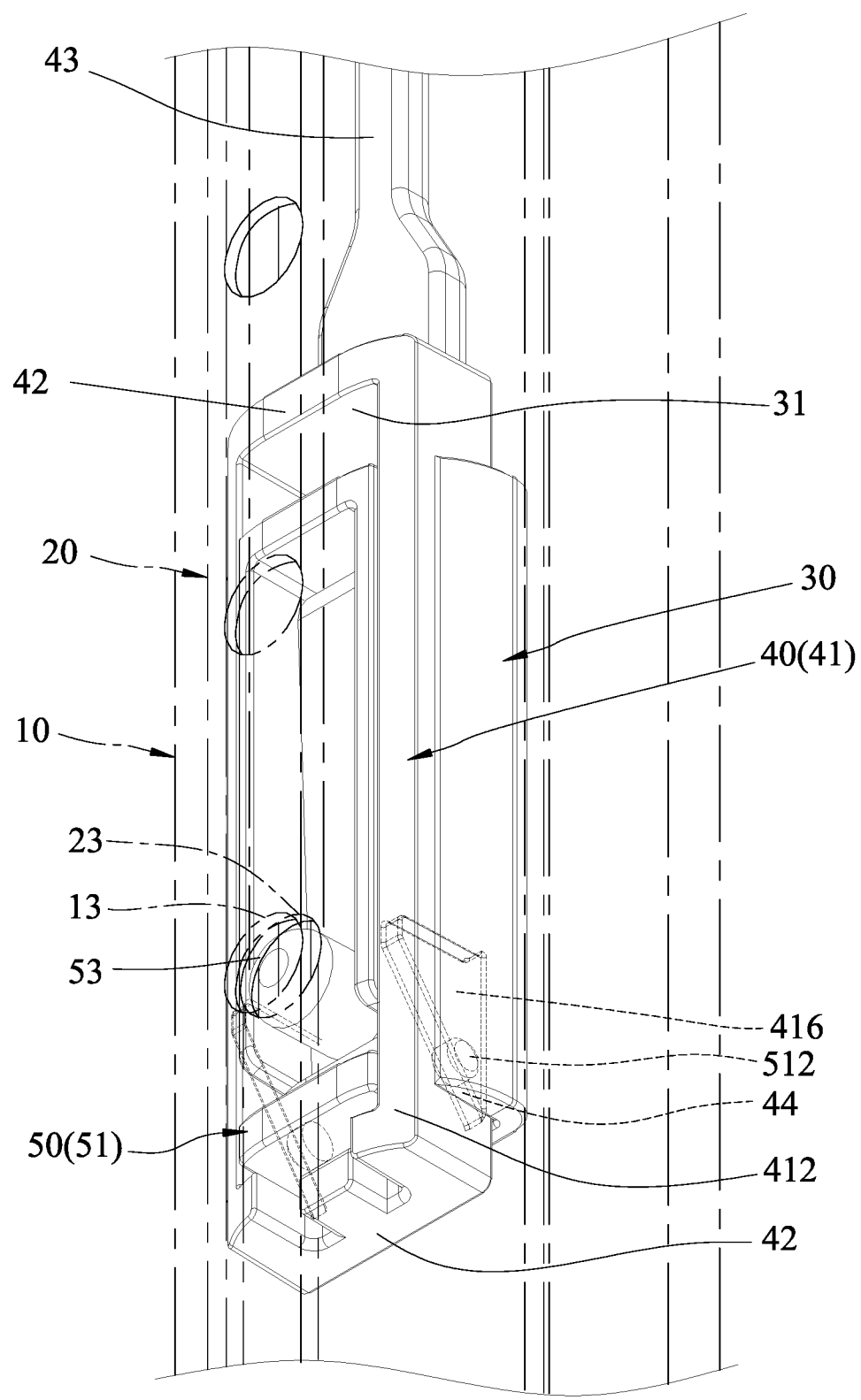
FIG. 9 is a fragmentary ghosted perspective view showing a lug of the adjustment control unit of the embodiment in a disengaging position.
Figure 10:
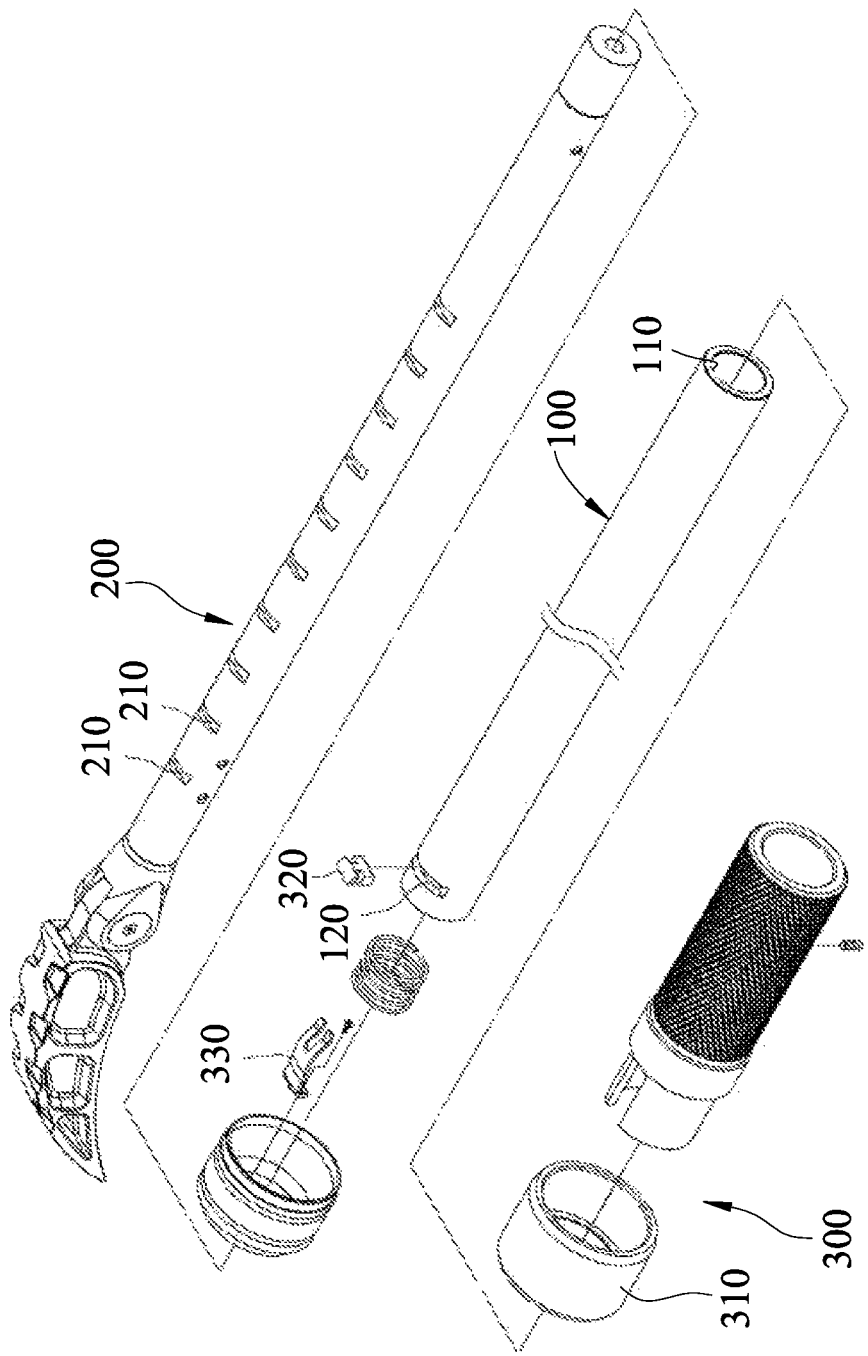
FIG. 10 is an exploded perspective view illustrating a conventional telescopic rod device according to Taiwanese Invention Patent No. 1709466.

Referring to FIGS. 7 to 9, when an operator pulls the operating grip 431 upwardly to move the side panels 41 towards the handle 60 along the lengthwise axis (X), the restraining member 51 is actuated by the actuator unit 40 to move relative to the positioning seat 30 along the first widthwise axis (Y) while also sliding on the inclined slide surfaces (S) of the actuating portions 44. The restraining portions 512 of the restraining member 51 gradually slide toward the lower end of the inclined slide surfaces (S) adjacent to the fourth edges 414 of the side panels 41. At this state, the U-shaped frame 511 of the restraining member 51 that straddles the end portion 522, causes the end portion 522 of the resilient member 52 to move toward the other end portion 523 so that the lug 53 retracts from the corresponding adjustment hole 13 and changes to a disengaging position from the engaging position. At this state the inner tube 20 may be moved relative to the outer tube 10 along the lengthwise axis (X) and the telescopic rod device may be adjusted to a desired overall length. When the telescopic rod device is at the desired length, the operator may release the operating grip 431, the two end portions 522, 523 of the resilient member 52 that are compressed will elastically return and move away from each other. This will cause the lug 53 that is connected to the end portion 522 to engage a selected adjustment hole 13 of the outer tube wall 12.

The telescopic rod device according to the present disclosure is easy to operate and is capable of quick adjustment. The telescopic rod device also has a safe operating mechanism that will not catch the operator's hand and cause injury.

Additionally, the telescopic rod device has the following advantages:
1. The operator may frequently apply downwardly pressure on the handle 60 when the telescopic rod device is used as a walking aid. Therefore by designing the actuator unit 40 operable to move along the lengthwise axis (X) by upwardly pulling the operating grip 431 for actuating the restraining member 51, accidental operation of the operating grip 431 due to unintentional downward pressing of the operating grip 431 may be prevented.
2. The inclined slide surface (S) of the actuating portion 44 is inclined relative to the lengthwise axis (X) and the first widthwise axis (Y) and allows precise extension and retraction of the lug 53 and improves safety.
3. By virtue of the restraining member 51 having a U-shaped frame 511, the restraining portions 512 are respectively connected to the two side arms 514 and disposed on opposite sides of the bar 513, thereby allowing the actuating portions 44 of the actuator unit 40 to respectively actuate movement of the restraining portions 512 of the restraining member 51 along the first widthwise axis (Y). The movement of the restraining portions 512 along the first widthwise axis (Y) will be smooth and steady by having the actuating portions 44 respectively actuating the movement of the restraining portions 512.

In summary of the above, the telescopic rod device has a simple structure that is easy to assembly, and also has the advantage of preventing hand injury of the operator.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A telescopic rod device capable of quick adjustment, comprising:
an outer tube having a lengthwise axis, and including an outer tube wall that surrounds an outer tube inner space, and a plurality of adjustment holes that penetrate through said outer tube wall and that are spaced apart from each other along the lengthwise axis;
an inner tube mounted inside said outer tube, and being movable along the lengthwise axis, and having
an inner tube wall that surrounds an inner tube space, and
a through hole that is formed through said inner tube wall;
an actuator unit mounted inside said inner tube, being movable in the lengthwise axis, and having at least one actuating portion; and
an adjustment control unit installed inside said inner tube, and having
an restraining member that has at least one restraining portion to interact with said at least one actuating portion, and that is movable along a first widthwise axis of said outer tube, which is perpendicular to the lengthwise axis, a resilient member that is interconnected to said restraining member, and
a lug connected to said resilient member and protruding from said through hole of said inner tube to engage with one of said adjustment holes of said outer tube wall of said outer tube;
wherein said at least one actuating portion is an inclined slide surface that is inclined with the lengthwise axis and the first widthwise axis, and said at least one restraining portion is a guide post slidable on said inclined slide surface;
wherein said resilient member constantly biases said lug to extend out of said through hole of said inner tube and engage one of said adjustment holes, and when said actuator unit moves relative to said inner tube along the lengthwise axis, said at least one actuating portion of said actuator unit actuates movement of said at least one restraining portion of said restraining member along the first widthwise axis, and said restraining member acts on said resilient member so that said lug disengages from said one of said adjustment holes, thereby converting said lug between an engaging position and a disengaging position;
wherein said resilient member has a U-shaped curved portion and two end portions extending from opposite ends of said curved portion, said lug being connected to one of said two end portions, and said one of said two end portions resiliently urging said restraining member; and
wherein, when said actuating portion of said actuator unit actuates said at least one restraining portion of said restraining member, said restraining member causes said resilient member and said lug to move and allows said lug to change between said engaging position and said disengaging positon.

2. The telescopic rod device as claimed in claim 1, further comprising a positioning seat mounted inside said inner tube, and having
an installation slot accommodating said resilient member,
a pair of guiding slots spaced apart from each other along a second widthwise axis that is perpendicular to the lengthwise and first widthwise axes, and being respectively formed on two opposite sides of said installation slot, and
a sliding slot extending across and spatially communicating with said installation slot, and intersecting said guiding slots;
said actuator unit further having
a pair of spaced apart side panels that respectively and slidably extend through said pair of guiding slots,
two spaced apart end panels which intersectingly connect between said side panels, and
a linkage rod connected to one of said end panels and extending along the lengthwise axis to protrude from said inner tube, said side panels respectively have inner surfaces that face toward each other and that are recessed to form guide grooves, respectively;
wherein said at least one actuating portion includes two actuating portions each being said inclined slide surface and being located on a groove wall that bounds one of said guide grooves, and said restraining member being slidably mounted in said sliding slot and movable along the first widthwise axis.

3. The telescopic rod device as claimed in claim 2, wherein:
said side panels of said actuator unit each have a first edge, a second edge that is opposite to said first edge in the lengthwise axis, a third edge that intersectingly connect between said first edge and said second edge, and a fourth edge that is opposite to said third edge along the first widthwise axis; and
said guide groove of each side panel is trapezoidal, said inclined slide surface of each of said actuating portion extends from said third edge towards said fourth edge and is inclined to approach said second edge when reaching said fourth edge, said linkage rod being nearer to said first edge of said side panels than said second edge of said side panels.

4. The telescopic rod device as claimed in claim 2, wherein said restraining member further has a U-shaped frame that straddles said one of said two end portions of said resilient member and that has a bar, and two side arms disposed on opposite sides of said bar and interconnected by said bar, said at least one restraining portion including two restraining portions respectively connecting said two side arms.

5. The telescopic rod device as claimed in claim 1, further comprising a positioning seat immovably mounted inside said inner tube, wherein:
said positioning seat has an installation slot accommodating said resilient member, a pair of guiding slots extending along the lengthwise axis, spaced apart from each other in a second transverse axis of said outer tube that is perpendicular to the lengthwise and first widthwise axes, and respectively formed on two opposite sides of said installation slot, and a sliding slot extending across and spatially communicating with said installation slot and intersecting said guiding slots;
said actuator unit further has a pair of side panels that respectively pass through said guiding slots along the lengthwise axis, said side panels respectively having inner surfaces facing toward each other;
said at least one actuating portion includes two actuating portions each of which is said inclined slide surface and is located on one of said inner surfaces of said side panels;
said restraining member is slidably mounted in said sliding slot, and extends across said installation slot, said at least one restraining portion of said restraining member includes two restraining portions respectively extending into said guiding slots to respectively slide on said inclined slide surfaces of said two actuating portions.

6. The telescopic rod device as claimed in claim 5, wherein said resilient member has a U-shaped curved portion and two end portions that extend from opposite ends of said curved portion and that are spaced apart in the first widthwise direction, said lug being connected to one of said two end portions, said one of said two end portions urging said restraining member.

7. The telescopic rod device as claimed in claim 6, wherein said restraining member further has a U-shaped frame that straddles said one of said two end portions of said resilient member and that has a bar, and two side arms interconnected by said bar and spaced apart in the second widthwise axis, said two restraining portions being formed as guide posts and respectively connecting said two side arms.

8. The telescopic rod device as claimed in claim 5, wherein:
said side panels of said actuator unit each have a first edge, a second edge that is opposite to said first edge along the lengthwise axis, a third edge that extends along the lengthwise axis and that connects between said first edge and said second edge, and a fourth edge that is opposite to said third edge along the first widthwise axis;

said inclined slide surface on each of said side panels extends from said third edge to said fourth edge and is inclined to approach said second edge when reaching said fourth edge.

* * * * *